Dec. 9, 1924.

E. W. BRUCKNER ET AL 1,518,897

CRY PRODUCING DEVICE FOR TOYS

Filed Nov. 9, 1922

Inventors
Elliott W. Bruckner
and Henry B. Bruckner
By C. P. Goepel
their Attorney Patented Dec. 9, 1924.

1,518,897

UNITED STATES PATENT OFFICE.

ELLIOTT W. BRUCKNER AND HENRY B. BRUCKNER, OF JERSEY CITY, NEW JERSEY.

CRY-PRODUCING DEVICE FOR TOYS.

Application filed November 9, 1922. Serial No. 599,744.

*To all whom it may concern:*

Be it known that we, ELLIOTT W. BRUCKNER and HENRY B. BRUCKNER, both citizens of the United States, and residents of Jersey City, in the county of Hudson and State of New Jersey, have invented certain new and useful Improvements in Cry-Producing Devices for Toys, of which the following is a specification.

This invention relates to an improved cry producing device for toys and has for its primary object to provide a device of simple and inexpensive construction particularly designed for use in connection with rag dolls and capable of being embodied within the arm or any portion of the body structure of the doll so that when such portion is grasped and compressed under the pressure of the hand, a sound realistically simulating an infant's cry will be produced. It will, therefore, be understood that by utilizing different forms of sounding reeds the device might be embodied in animal toys of different kinds to simulate the bark of a dog or various other animal cries.

In one embodiment of our invention we propose to provide an air receiving chamber the walls of which are composed of an impervious fabric or other easily collapsible material. Within this air chamber there is loosely arranged an expansible element in the form of a sheet of resilient material bent upon itself and having opposed spaced apart edges. This resilient member extends substantially the full length of the air chamber and holds the flexible walls thereof normally under expansion. To the flexible air chamber wall and extending through the same a sounding reed is suitably attached, the inner end portion of the reed projecting into the air chamber between the spaced edges of said expansible member. Thus when the opposite sides of the expansible member are grasped by the hand and forced inwardly towards each other, the walls of the air chamber are partially collapsed and the air is expelled from said chamber through the sounding reed.

With the above and other objects in view the invention consists in the improved sound or cry producing device for toys and in the form, construction and relative arrangement of its several parts as will be hereinafter more fully described, illustrated in the accompanying drawings and subsequently incorporated in the subjoined claims.

In the drawing wherein we have disclosed one practical and satisfactory embodiment of the invention and in which similar reference characters designate corresponding parts throughout the several views.

Figure 1:
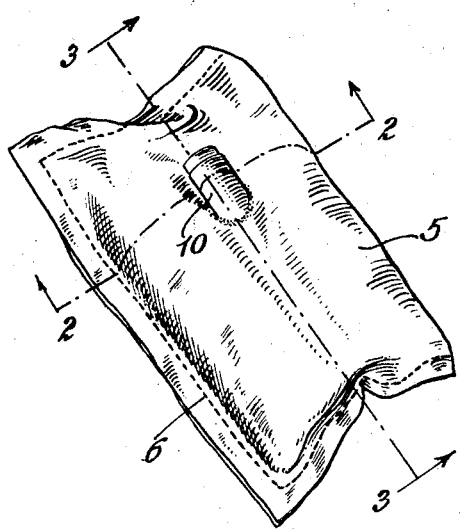
Figure 1 is a perspective view illustrating our improved sound producing device.

Referring in detail to the drawing, we have shown the air chamber of the device as constructed from a sheet of linen or other fabric material indicated at 5 and suitably treated to render the same substantially impervious. This sheet of material is folded upon itself and the edges thereof stitched together as at 6.

Before completely closing the air chamber, there is inserted therein an expansible member which normally holds the walls of the air chamber in distended condition. This member, as herein shown, is formed from a sheet of stiff cardboard, metal or other material of desired resiliency. This sheet of material is bent upon itself into general oval shape or form in plan whereby there is provided an intermediate curved wall section 7 and curved inwardly extending edge portions 8 disposed in opposed relation to the wall sections 7. These portions 7 and 8 of the resilient member bear against the opposite side walls of the air chamber and urge the same outwardly into distended relation to each other. The extreme edges of the resilient member are turned or bent inwardly upon themselves as shown at 9, so that the linen or fabric walls of the air chamber will not be cut thereby.

Figure 2:
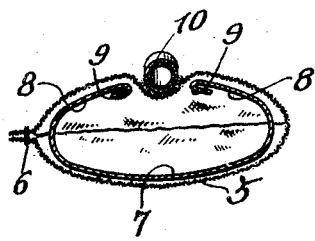
Figure 2 is a horizontal section taken on the line 2—2 of Figure 1.
Figure 3:
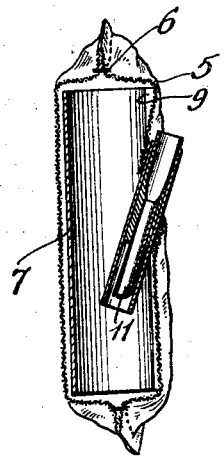
Figure 3 is a longitudinal section taken on the line 3—3 of Figure 1.

In one side wall of the air chamber and between the bent edges 9 of the resilient expansion member which are spaced apart, as clearly shown in Figure 2, an opening is provided through which a tube 10 provided with a sounding reed 11 of any desired conventional form is disposed. The tube is preferably arranged through said opening at an oblique inclination relative to the lengthwise dimension of the air chamber and is suitably fixed to the fabric wall of said chamber around the edges of the opening therein as by means of an adhesive material. As seen in Figure 3, the sounding reed is located at the inner end of the tube 10. In the application of the device above described, to a doll or other toy, the walls of the air chamber are suitably secured within the hollow arm, body or other portion of the toy. It will, therefore, be readily understood that when this part of the toy figure is grasped with the hand, the actual act of closing the hand compresses or collapses the expansion member 7 in the walls of the air chamber, the opposed spaced apart edges 9 of the resilient member approaching each other. Therefore, the air within the chamber is forced out from the reed tube and in passing the reed the sound is produced. Immediately upon the release of pressure on the resilient member, said member returns to its normal form, the parts 7 and 8 thereof again expanding and distending the walls of the air chamber so that said chamber again becomes filled with air entering through the reed tube 10.

Our invention particularly lends itself to such use, since the sound will likewise be produced when pressure is applied to opposite side walls of the air chamber transversely thereof, as well as upon the application of a lateral pressure. When the pressure is applied transversely, the edge portions 8 and the intermediate portion 7 of the expansible element are forced towards each other, thus also causing the collapsion of the chamber walls and the expulsion of the air through the sounding reed.

From the foregoing description considered in connection with the accompanying drawing, it will be seen that we have successfully produced an exceedingly simple and practical device of this character for use in connection with rag dolls or other toys which are manufactured to retail at relatively small expense. Owing to the extremely simple and durable construction of our device, it will be appreciated that the manufacturing and selling cost of such toys as now constructed will not be materially increased. The device can of course be made in various sizes.

It will therefore be understood that while we have herein illustrated and described an embodiment of our invention which we have found very satisfactory in practical use, the device may also be constructed in various other alternative arrangements, and we accordingly reserve the privilege of adopting all such legitimate changes as may be fairly embodied within the spirit and scope of the invention as claimed.

We claim:

1. In a sound producing device for toys, an air chamber having walls of flexible material, means enclosed within said chamber and normally sustaining the walls thereof in distended relation without substantially reducing the air capacity of said chamber, and a sound producing device extending through one of the flexible side walls of said chamber at an oblique angle with respect to the major axis of said chamber and through which the air is expelled upon the application of pressure to collapse the chamber walls.

2. In a sound producing device for toys, an air chamber having walls of flexible material provided with an internal lining of stiff resilient sheet material normally sustaining said flexible walls in distended relation, and a reed tube fixed intermediate of its ends in one of the side walls of said chamber and supported thereby independently of said lining member.

3. In a sound producing device for toys, an air chamber having walls of flexible collapsible material, a member arranged within said chamber to hold the walls thereof in distended relation and consisting of a single sheet of resilient material bent into continuous curved form in cross-section and having opposed spaced apart edges, and a reed tube extending through one of the chamber walls between the spaced edges of said member, whereby upon compression upon said member and collapse of the chamber walls, the desired sound is produced.

4. In a sound producing device for toys, an air chamber having collapsible walls, a member arranged within said chamber and normally holding the walls thereof in distended relation, said member consisting of a sheet of resilient material bent into continuously curved form in cross-section and having spaced apart edges, said member and the walls of the air chamber yielding to collapsing pressure, and a reed tube fixed to one of the chamber walls through which the air is expelled upon the application of pressure to produce the desired sound.

In testimony that we claim the foregoing as our invention, we have signed our names hereunder.

ELLIOTT W. BRUCKNER.
HENRY B. BRUCKNER.